(12) United States Patent
Kadosh et al.

(10) Patent No.: US 9,509,639 B1
(45) Date of Patent: Nov. 29, 2016

(54) SWITCH DEVICE HAVING A PLURALITY OF PROCESSING CORES (71) Applicant: Marvell Israel (M.I.S.L) Ltd., Yokneam (IL)

(72) Inventors: Aviran Kadosh, Misgav (IL); Nafea Bshara, San Jose, CA (US)

(73) Assignee: MARVELL ISRAEL (M.I.S.L) LTD., Yokneam (IL)

( * ) Notice: Subject to any disclaimer, the term of this patent is extended or adjusted under 35 U.S.C. 154(b) by 0 days.

(21) Appl. No.: 14/936,271

(22) Filed: Nov. 9, 2015

Related U.S. Application Data

(63) Continuation of application No. 13/745,493, filed on Jan. 18, 2013, now Pat. No. 9,185,052, which is a continuation of application No. 12/706,704, filed on Feb. 16, 2010, now Pat. No. 8,358,651.

(60) Provisional application No. 61/244,292, filed on Sep. 21, 2009.

(51) Int. Cl.
*H04L 12/50* (2006.01)
*H04L 12/935* (2013.01)
*H04L 29/06* (2006.01)

(52) U.S. Cl.
CPC ....... *H04L 49/3063* (2013.01); *H04L 49/3027* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 5,896,380 A | 4/1999 | Brown et al. | |
| 6,807,179 B1 | 10/2004 | Kanuri et al. | |
| 6,813,268 B1 | 11/2004 | Kalkunte et al. | |
| 6,874,039 B2 | 3/2005 | Ganapathy et al. | |
| 7,111,162 B1 | 9/2006 | Bagepalli et al. | |
| 7,362,750 B2 | 4/2008 | Choi et al. | |
| 7,424,019 B1 | 9/2008 | Kopelman et al. | |
| 7,443,790 B2 | 10/2008 | Aicklen et al. | |
| 7,817,627 B2 | 10/2010 | Beshai | |
| 7,924,860 B1 | 4/2011 | Frailong et al. | |

(Continued)

FOREIGN PATENT DOCUMENTS

WO  WO-99/07180  2/1999

OTHER PUBLICATIONS

IEEE Std 802.3-2002, "IEEE Standard for Information technology—Telecommunications and information exchange between systems—Local and metropolitan area networks—Specific requirements, Part 3: Carrier sense multiple access with collision detection(CSMA/CD) access method and physical layer specifications," *The Institute of Electrical and Electronics Engineers, Inc.* (Mar. 8, 2002).

(Continued)

*Primary Examiner* — Michael J Moore, Jr.

(57) ABSTRACT

A switching device comprises a plurality of switch cores, each switch core having a plurality of ports associated with the switch core. A first switch core is configured to perform ingress processing of a data frame to determine a target port via which the data frame is to be transmitted. If the target port is associated with the first switch core, the first switch core performs egress processing on the data frame and directs the data frame to the target port. If the target port is associated with a second switch core, the data frame is directed to the second switch core at which egress processing on the data frame is performed, including directing the data frame to the target port.

20 Claims, 6 Drawing Sheets

(56) References Cited

U.S. PATENT DOCUMENTS

| | | | |
|---|---|---|---|
| 7,970,961 | B2 | 6/2011 | Ganapathy et al. |
| 8,090,913 | B2 | 1/2012 | Pelley, III et al. |
| 8,130,754 | B2 | 3/2012 | Binkert et al. |
| 8,279,871 | B1 | 10/2012 | Sivan et al. |
| 8,358,651 | B1 | 1/2013 | Kadosh et al. |
| 8,401,043 | B1 | 3/2013 | Kadosh et al. |
| 9,185,052 | B1 | 11/2015 | Kadosh et al. |
| 2006/0147208 | A1 | 7/2006 | Aicklen et al. |
| 2006/0245423 | A1 | 11/2006 | Best et al. |
| 2007/0168531 | A1 | 7/2007 | Sitaraman et al. |
| 2008/0037531 | A1 | 2/2008 | Donoghue et al. |
| 2008/0114887 | A1 | 5/2008 | Bryers et al. |
| 2008/0123525 | A1 | 5/2008 | Miyoshi et al. |
| 2008/0159309 | A1 | 7/2008 | Sultan et al. |
| 2008/0225853 | A1 | 9/2008 | Melman et al. |
| 2008/0315985 | A1 | 12/2008 | Johnsen et al. |
| 2009/0196303 | A1 | 8/2009 | Battle et al. |
| 2009/0259825 | A1 | 10/2009 | Pelley, III et al. |
| 2010/0046537 | A1 | 2/2010 | Perlmutter et al. |
| 2010/0098104 | A1 | 4/2010 | Marshall |
| 2010/0142398 | A1 | 6/2010 | Arad et al. |
| 2011/0026541 | A1 | 2/2011 | Beshai |
| 2011/0093660 | A1 | 4/2011 | Pelley, III et al. |
| 2011/0164616 | A1 | 7/2011 | Kloth et al. |
| 2012/0042121 | A1 | 2/2012 | Kim et al. |

OTHER PUBLICATIONS

IEEE Std 802.Mar. 2005, "IEEE Standard for Information technology—Telecommunications and information exchange between systems—Local and metropolitan area networks—Specific requirements, Part 3: Carrier sense multiple access with collision detection(CSMA/CD) access method and physical layer specifications," *The Institute of Electrical and Electronics Engineers, Inc.*, Sections 1-5 (Dec. 9, 2005).

IEEE Draft P802.3ae/D5.0, "Supplement to Carrier Sense Multiple Access with Collision Detection (CSMA/CD) Access Method & Physical Layer Specifications—Media Access Control (MAC) Parameters, Physical Layer, and Management Parameters for 10 Gb/s Operation," *The Institute of Electrical and Electronics Engineers, Inc.*, 540 pages (May 1, 2002).

Chen, "Home Network Basis: Transmission Environments and Wired/Wireless Protocols," Prentice Hall, 26 pages (Jul. 2003).

SWITCH DEVICE HAVING A PLURALITY OF PROCESSING CORES

CROSS-REFERENCE TO RELATED APPLICATION

This application is a continuation of U.S. application Ser. No. 13/745,493, entitled "Switch Device Having a Plurality of Processing Cores," which was filed on Jan. 18, 2013, which is a continuation of U.S. patent application Ser. No. 12/706,704, now U.S. Pat. No. 8,358,651, entitled "Switch Device Having a Plurality of Processing Cores," which was filed on Feb. 16, 2010, which claims the benefit of U.S. Provisional Patent Application No. 61/244,292, entitled "Multi-Core Ethernet Switch," which was filed on Sep. 21, 2009. The entire disclosures of the patent applications referenced above are hereby incorporated by reference herein.

FIELD OF THE DISCLOSURE

The present disclosure relates generally to communication networks and, more particularly, to switching devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some networking applications require switching among a large number of ports.

SUMMARY

In an embodiment, a switching device comprises a plurality of ports, and a plurality of switch cores disposed on one or more integrated circuits. The plurality of switch cores including a first switch core corresponding to a subset of ports among the plurality of ports and one or more second switch cores corresponding to ports outside of the subset of ports. The first switch core is configured to perform ingress processing operations on first network data frames received via the subset of ports, wherein the ingress processing operations include determining respective target ports for the first network data frames. The first switch core is configured to, for first network data frames corresponding to target ports outside of the subset of ports, direct to the one or more second switch cores i) respective header information and ii) respective port identifiers of the determined target ports, so that the one or more second switch cores can i) perform egress processing operations on the first network data frames, and ii) direct the first network data frames to the corresponding target ports using the port identifiers. The first switch core is also configured to, for network data frames corresponding to target ports within the subset of ports, perform, at the first switch core, egress processing operations on the network data frames, and direct the network data frames to one or more determined target ports in the subset of ports.

In another embodiment, a method includes: receiving, at a first switch core among a plurality of switch cores, first network data frames, the first network data frames having been received via subset of ports corresponding to the first switch core, the subset of ports among a plurality of ports coupled to the plurality of switch cores; performing, at the first switch core, ingress processing operations on first network data frames received via the subset of ports, wherein the ingress processing operations include determining respective target ports for the first network data frames; for first network data frames corresponding to target ports outside of the subset of ports, directing to one or more second switch cores i) respective header information and ii) respective port identifiers of the determined target ports, so that the one or more second switch cores can i) perform egress processing operations on the first network data frames, and ii) direct the first network data frames to the corresponding target ports using the port identifiers; and for network data frames corresponding to target ports within the subset of ports, performing, at the first switch core, egress processing operations on the network data frames, and direct the network data frames to one or more determined target ports in the subset of ports.

DETAILED DESCRIPTION

Example switching methods and apparatus are described herein in the context of Ethernet networks. It is noted, in light of the disclosure and teachings herein, that similar methods and apparatus are suitable to be utilized in other communication networks as well.

Figure 1:
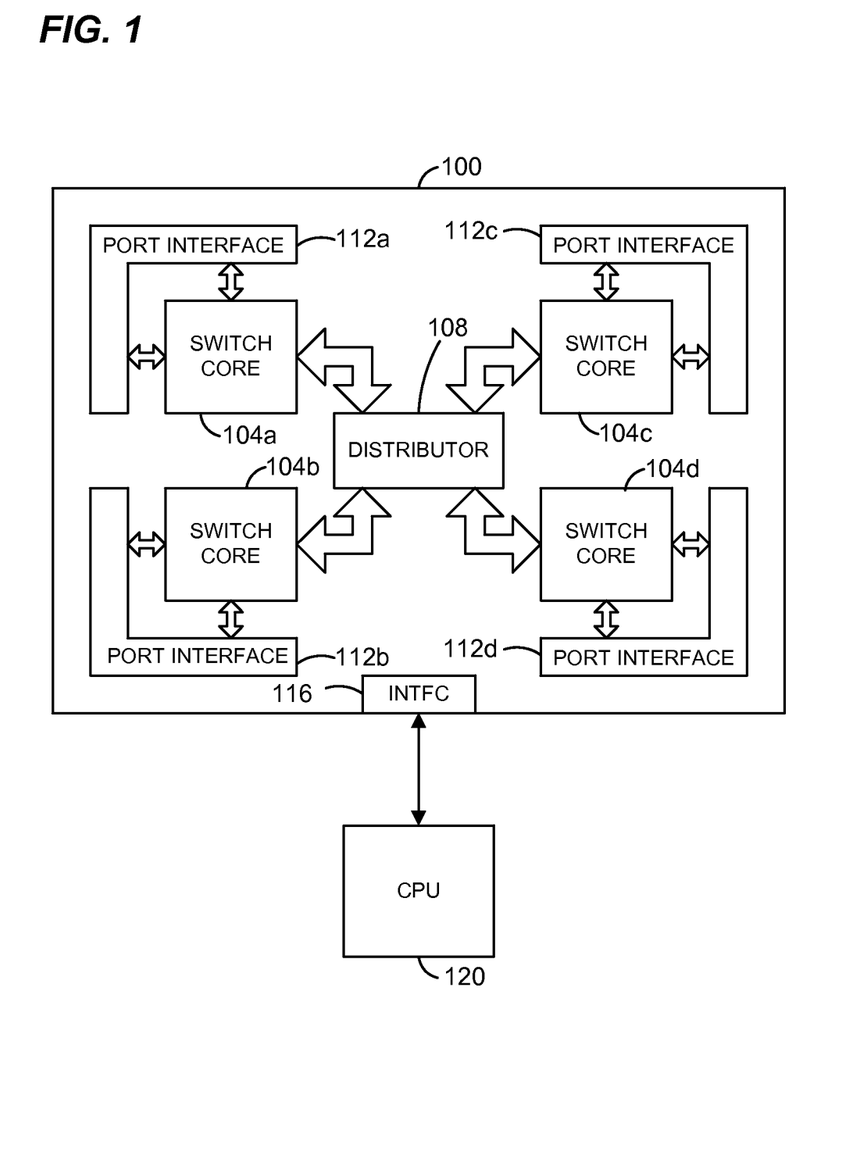
FIG. 1 is a block diagram of an example integrated circuit (IC) that is utilized in a switch device, according to an embodiment.

FIG. 1 is a block diagram of an example integrated circuit (IC) 100 that may be utilized in a switch device, such as an Ethernet switch. The IC 100 includes a plurality of switch cores 104a-104d disposed on the IC and coupled together via a distributor 108. Additionally, each switch core 104 is coupled with a corresponding port interface 112a-112d, and each port interface supports coupling to a plurality suitable ports, which in accordance with embodiments of the disclosure are optical and/or electrical ports. It is noted that, in light of the disclosure and teachings herein, in accordance with an embodiment, the IC 100 suitably enables switch devices capable of switching between a high number of ports and in a small form factor, in at least some embodiments. For example, in one embodiment, the IC 100 is capable of switching between at least 48 ten Gigabit per second (10 Gbps) ports. According to one embodiment, a switch device, having a one rack unit (1U) form factor, may include, for example, three IC's 100, and the switch device is capable of switching between 72 ports. It is noted that switch devices capable of switching between a high number of ports and in a small form factor are useful for applications such as data centers and server farms, for example.

In other embodiments, the IC 100 is capable of switching between less than or more than 48 ports and each port is capable of speeds other than 10 Gbps (i.e., higher or lower than 10 Gbps). Additionally, although FIG. 1 illustrates four switch cores 104, in other embodiments, less than four (i.e., two or three) or more than four switch cores 104, with the corresponding number of port interfaces 112, are included on the IC 100.

According to one embodiment, each switch core 104 is associated with a corresponding port interface 112, which handles ports local to the switch core 104. For example, the ports handled by port interface 112a are considered local ports of the switch core 104a. Similarly, the ports handled by port interface 112b are considered local ports of the switch core 104b. Generally when a switch core 104 receives a data frame via a local source port, the switch core 104 determines the target port to which the data frame should be transmitted, which may or may not be a local port respective of the receiving switch core 104. If the target port is not a local port of the receiving switch core, the switch core 104 performs some, but not all, processing operations on the received data frame and then transmits the data frame to the distributor 108. The distributor 108 subsequently directs the data frame to the appropriate other switch core 104 with respect to which the target port is a local port. Processing operations on the data frame are completed at the switch core 104 associated with the target port. For example, when a data frame is received by the switch core 104a via a local port of the switch core 104a, the switch core 104a determines the target port. If the target port corresponds to the switch core 104d, for example, the switch core 104a transmits the data frame to the distributor 108, which then directs the data frame to the switch core 104d. Next, the switch core 104d forwards the data frame to the target port, which is a local port of the switch core 104d. In the example, some processing operations on the data frame, typically ingress processing operations, are performed at the receiving switch core 104a, while additional processing operations on the data frame, typically egress processing operations, are performed at the switch core 104d.

In an embodiment, a switch core 104 forwards a data frame to the distributor 108 even if the target port is a local port of the switch core 104. In another embodiment, a switch core 104 does not forward a data frame to the distributor 108 if the target port is a local port of the switch core 104. Rather, the data frame is further processed by the switch core 104 without being provided to the distributor 108.

Data frames, when received via a port interface 112, may be stored in a memory of the IC 100 (not shown in FIG. 1) and remain in the same location while being processed by switch cores 104 and the distributor 108. For example, a pointer or other identifier of a data frame may be passed between a switch core 104 and the distributor 108, or between switch cores 104. Thus, although switch cores 104 were described above as sending or forwarding data frames to the distributor 108 or another switch core 104, in an embodiment, sending or forwarding a data frame between a switch core 104 and the distributor 108, or between switch cores 104 comprises sending a pointer or other identifier of a data frame stored in a memory and/or a sending a descriptor associated with the data frame or a pointer to the descriptor. In other embodiments, sending or forwarding a data frame between a switch core 104 and the distributor 108, or between switch cores 104, comprises sending the actual data frame.

The IC 100 includes a central processing unit (CPU) interface 116 to interface with a CPU 120. The interface 116 permits the CPU 120 to communicate with each of the switch cores 104. In one embodiment, the interface 116 comprises a CPU port (e.g., a gigabit media independent interface (GMII) or other suitable interface) and a serial management interface (SMI), or any suitable interface(s). The IC 100 can include other interfaces as well such as one or more peripheral component interconnect express (PCI-E) interfaces, one or more two-wire serial interface (TWSI) interfaces, and/or other suitable interfaces.

Figure 2:
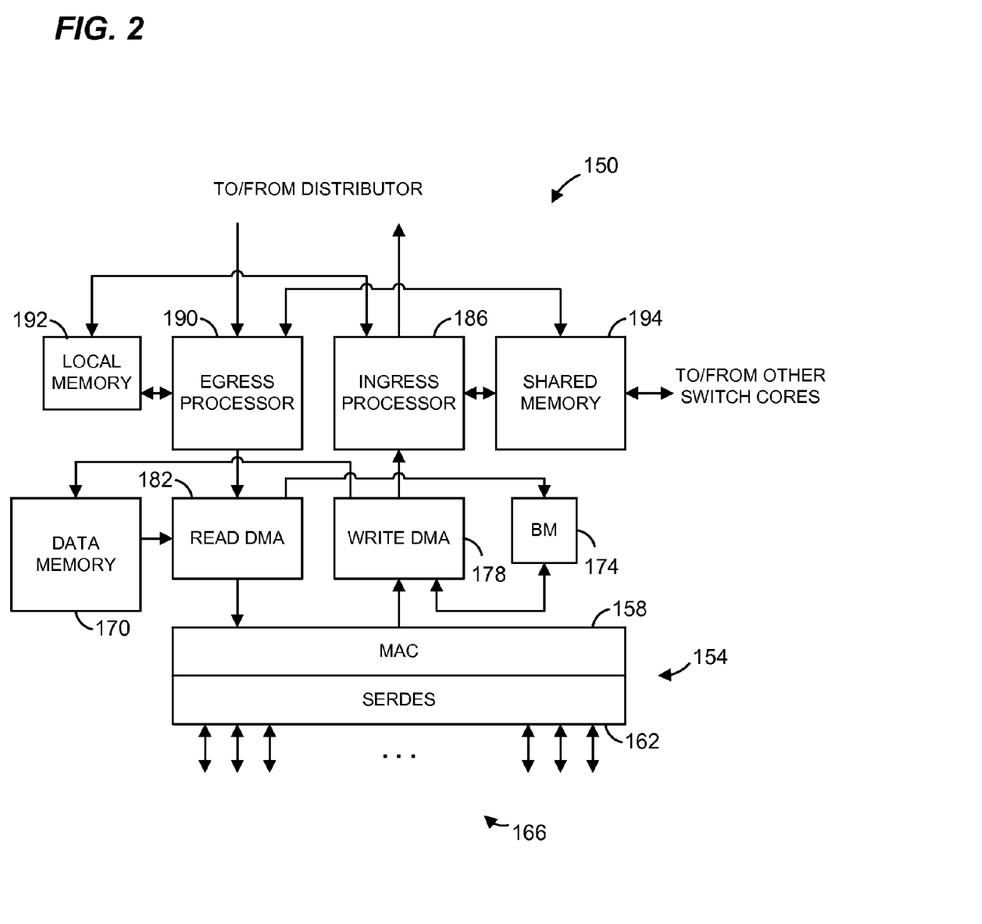
FIG. 2 is a block diagram of an example implementation of the switch core/port interface that is utilized for the IC of FIG. 1, according to an embodiment.

FIG. 2 is a block diagram of an example switch core 150 that may be utilized for each switch core 104/port interface 112 pair of FIG. 1. The switch core 150 includes a port interface 154 that may correspond to a port interface 112 of FIG. 1. The port interface 154 includes a media access control (MAC) block 158 and a serializer/deserializer (SERDES) block 162. The SERDES block 162 generates and receives a plurality of serial signals 166 corresponding to a plurality of local ports of the switch core 150. In one embodiment, the plurality of serial signals 166 includes Reduced 10 Gigabit Attachment Unit Interface (RXAUI) signals such as disclosed in U.S. patent application Ser. No. 12/621,268, filed Nov. 18, 2009, entitled "HARDWARE INTERFACE UTILIZING ALIGNMENT SYMBOLS FOR DEMULTIPLEXING," which is hereby incorporated by reference herein. Additionally or alternatively, the plurality of serial signals 166 includes 10 Gigabit Attachment Unit Interface (XAUI) signals according to the IEEE 802.3ae Standard, and/or other suitable signals.

In one embodiment, the MAC block 158 includes a plurality of MAC processors, wherein each MAC processor corresponds to a port. For example, each MAC processor implements MAC functions in conjunction with the port to which the MAC processor corresponds, according to an embodiment. In an embodiment, each MAC processor implements MAC functions that conform to the IEEE 802.3 Standard. In other embodiments, other suitable MAC functions are implemented. In an embodiment, the SERDES block 162 includes a plurality of SERDES, wherein the plurality of SERDES is grouped according to ports, i.e., each group of SERDES corresponds to a port. For example, in one embodiment, each group of two SERDES corresponds to a port. In another embodiment, each group of four SERDES corresponds to a port. Other numbers of SERDES per group may be utilized as well. In one embodiment, the number of SERDES in a group that corresponds to a port is configurable. In another embodiment, the number of SERDES in a group that corresponds to a port is fixed and nonconfigurable.

The switch core 150 further includes a data memory 170, a buffer management unit 174, a write direct memory access (DMA) unit 178, and a read DMA unit 182. According to an embodiment, the buffer management unit 174 allocates buffers in the data memory 170 for storing data frames received via the SERDES block 162. For example, when a data frame is received via the SERDES block 162, the buffer management unit 174 allocates a buffer for the data frame, if warranted, and the write DMA writes information from the data frame into the data memory 170 at locations corresponding to the allocated buffer. The buffer management unit 174 provides the write DMA unit 178 with information regarding the location of the allocated buffer. When a data frame is to be transmitted via the SERDES block 162, the read DMA unit 182 reads data frame data from the allocated buffer and provides the data frame data to the MAC block 158. In an embodiment, the read DMA unit 182 indicates to the buffer management unit 174 that an allocated buffer is available to be deallocated because the data frame has been provided to the MAC block 158 for transmission via a port.

An ingress processor 186 processes data frames received via the port interface 154. The ingress processor 186 generally determines how the data frame should be forwarded. For example, the ingress processor 186 generally processes the data frame to determine the target port to which the data frame is to be egressed. The target port can be either a port that is local to the switch core 150 or a port that is non-local to the switch core 150, i.e., the target port can be a port of the same switch core or a port of another switch core. The target port is indicated by a port number or other suitable indicator. In an embodiment, the target port indicator determined by the ingress processor 186 is unique for multiple switch cores 104, 150 of the IC 100 (e.g., all switch cores 104, 150 of the IC 100), whereas a source port indicator is unique only for the switch core 150 to which the data frame is ingressed. In an embodiment, after determining the target port for a data frame, the ingress processor 186 sends the data frame to the distributor. The term "ingressing port" is sometimes used herein to refer to the source port via which a data frame is received. The term "egressing port" is sometimes used herein to refer to the target port via which a data frame is transmitted.

An egress processor 190 processes data frames received via the distributor. The egress processor 190 generally performs various egress processing operations and forwards data frames to the target port indicated by the target port indicator.

A local memory 192 stores databases or tables utilized by the ingress processor 186 and the egress processor 190, such as a forwarding database (FDB), a next hop table, policy control list (PCL) data, VLAN data, multicast group data, etc. In an embodiment, the memory 192 includes one or more ternary content addressable memories (TCAMs), for example, to store one or more of FDB data, next hop data, PCL data, VLAN data, multicast group data, etc.

Referring now to FIGS. 1 and 2, in an embodiment, all switch cores 104, 150 on the IC 100 are associated with the same device number, but each port of the IC 100 has a unique global port indicator (e.g., number). On the other hand, each port of the IC 100 has a local port indicator (e.g., number) that is unique with respect to the associated switch core 104, 150, but is not unique with respect to other ports associated with other switch cores 104, 150 disposed in IC 100. In an embodiment, the ingress processor 186 utilizes local source port indicators (i.e., local to the switch core 150) and global target port indicators when processing an ingressing data frame or descriptor. Additionally, the egress processor 190 utilizes local target port indicators (i.e., local to the switch core 150) and global source port indicators when processing an egressing data frame or descriptor.

In accordance with an embodiment, FDB data, next hop data, PCL data, VLAN data, multicast group data, etc., is more efficiently stored in the local memory 192 for use by the switch cores 104, 150 as compared to storing the same data for all of the switch cores 104, 150. For example, PCL data, VLAN data, multicast group data, etc., that is unique to local ports of a switch core 104, 150 can be stored in the local memory 192, whereas this data need not be stored in other memories of other switch cores 104, 150. Similarly, PCL data, VLAN data, multicast group data, etc., for other non-local ports can be omitted from the local memory 192.

On the other hand, some data, such as FDB data, next hop data, etc., may need to be stored in each associated local memory 192 of all of the switch cores 104, 150, or otherwise provided to all the switch cores 104, 150. For example, in an embodiment, the IC 100 includes a shared memory 194 that is coupled to a plurality of switch cores 104, 150 in the IC 100. In this embodiment, some data, such as data utilized only by the switch core 150, is stored in the memory 170, whereas other data, such as data utilized by multiple switch cores, is stored in the shared memory 194.

Figure 3:
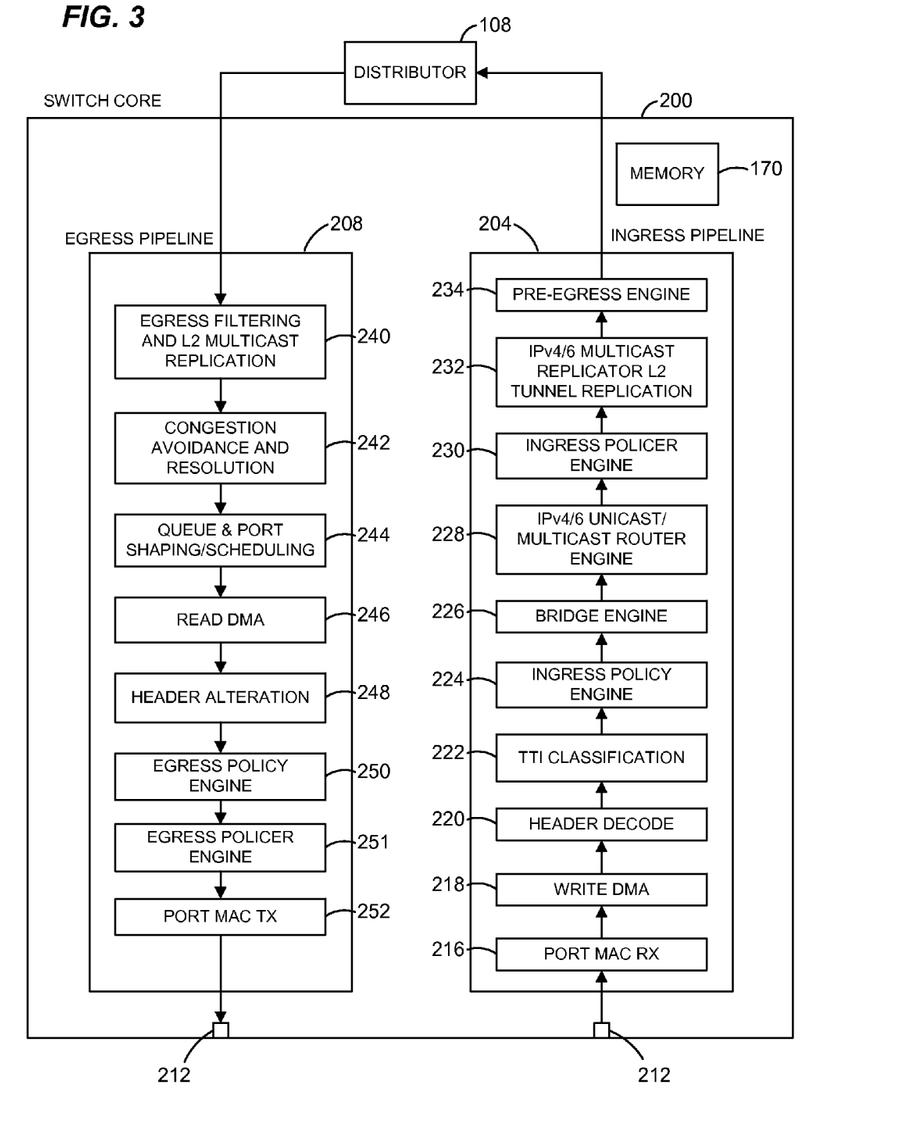
FIG. 3 is a block diagram of an example switch engine that is utilized for the IC of FIG. 1 and for the switch core of FIG. 2, according to an embodiment.

FIG. 3 is a block diagram of an example switch engine 200 that is suitable for use in each switch core 104/port interface 112 pair of FIG. 1 and for the example switch core 150 of FIG. 2. The example switch engine 200 utilizes a pipeline architecture for processing data frames. For example, the switch engine 200 includes an ingress pipeline 204 and an egress pipeline 208, each coupled to one or more ports 212. Additionally, the ingress pipeline 204 and the egress pipeline 208 are coupled together. For example, the ingress pipeline 204 and the egress pipeline 208 seen in FIG. 3 are coupled together via the distributor 108. It is noted that other couplings for an ingress pipeline and an egress pipeline are contemplated, for example via a distributor (not seen) that is internal to the switch core.

In accordance with an embodiment, the one or more ports 212 are suitable for coupling to one or more networks such as a wide area network (WAN), a local area network (LAN), such as a wired LAN or a wireless LAN (WLAN), etc. As seen in FIG. 3, the ingress pipeline 208 and the egress pipeline 208 each include a plurality of processing units coupled in series. Generally, each processing unit of a pipeline optionally processes a data frame, a portion of the data frame (e.g., a header), or a data frame descriptor and then passes the data frame, portion, or descriptor to the next unit in the pipeline. A descriptor may include some information from the data frame, such as some or all of the header information of the packet. The descriptor may include other information as well such as an indicator of where the data frame is stored in the memory 170, which in an embodiment is internal to switch core 200; alternatively in other embodiments (not seen) the memory 170 is external to the switch core and is shared by two or more switch cores 200 that are each disposed on the same integrated circuit. For ease of explanation, the term "data frame" hereinafter may be used to refer to a data frame itself, a portion of the data frame, or to a descriptor associated with the data frame. Thus, when the present disclosure refers to processing, sending, or forwarding a data frame, it is contemplated that, when appropriate, merely a descriptor of the data frame is processed, sent, or forwarded additionally or alternatively. Similarly, when the present disclosure refers to processing, sending, or forwarding a descriptor, it is contemplated that, when appropriate, the data frame associated with the descriptor may be processed, sent, or forwarded additionally or alternatively.

Each processing unit may or may not process a particular data frame. For example, in some instances, a processing unit may simply forward a data frame onto the next unit in the pipeline. In an embodiment, the last processing unit of the ingress pipeline 204 passes the data frame to the distributor. In another embodiment, the last processing unit of the ingress pipeline 204 is configured to also pass the data frame to the first unit in the egress pipeline 208 when the target port corresponds to the egress pipeline 208 (i.e., is one of the ports 212).

In an embodiment, each or at least some of the processing units of the ingress pipeline 204 and the egress pipeline 208 includes, or otherwise is associated with, a corresponding memory. A data frame received by a unit may be stored in the memory associated with the unit.

The ingress pipeline 204 includes a port media access control (MAC) receiver unit 216 coupled to the one or more ports 212. The port MAC receiver unit 216 generally implements media access control functions and forwards the data frame to a write DMA unit 218. A buffer management unit, such as the buffer management unit 174 of FIG. 2, allocates buffers for use by the write DMA unit 218. The write DMA unit 218 creates a descriptor and sends the descriptor and a header of the data frame to a header decode unit 220. Additionally, the write DMA unit 218 stores the data frame in the memory 170.

The header decode unit 220 generally decodes the header of each data unit received via the one or more ports 212. In an embodiment, this includes parsing or identifying different segments of the header for use by subsequent units in the ingress pipeline 204 and, optionally, units in the egress pipeline 208.

A tunnel termination and interface (TTI) classification unit 222 is coupled to the header decode unit 220. The TTI classification unit 222 generally performs a lookup function (a tunnel termination interface (TTI) lookup) that in an embodiment is used for tunnel termination identification and/or classifying a logical interface according to L2 or L3 header fields. The TTI lookup indicates that the data frame should be associated with one or more TTI actions, such as assigning a virtual LAN (VLAN) identifier, quality of service (QoS) parameters, etc., to the data frame. In an embodiment, if the TTI lookup utilizes a source port indicator, the local source port indicator is utilized.

Referring again to FIG. 1, in an embodiment, all switch cores 104, 200 on the IC 100 are associated with the same device number, but each port of the IC 100 has a unique global port indicator (e.g., number). For example, in this embodiment, another switching device separate from the IC 100 can indicate that a packet should be egressed from a particular port of the IC by providing a device number of the IC 100, which is common to all of the switch cores 104, 200 on the IC 100, and a global target port indicator. This is in contrast to a configuration, for example, in which each switch core 104, 200 on the IC 100 has a separate device number, and the other switching device separate from the IC 100 indicates that a packet should be egressed from a particular port of the IC 100 by providing a device number of one of the switch cores 104, 200 on the IC 100 and a local target port indicator, i.e., local to the particular switch core 104, 200 indicated by the device number. Each switch core 104, 200 is associated with local ports, and each port of the IC 100 has a local port indicator (e.g., number). The local port indicator is unique with respect to ports of the corresponding switch core 104, 200 with which the port is associated, but is non-unique with respect to ports of other switch cores 104, 200 in the same switch, for example the other switch cores 104, 200 that are disposed on a single IC 100.

In an embodiment, the TTI classification unit 222 utilizes a TCAM, and the TCAM stores TTI data associated with local source ports of the switch core 200 and does not store TTI data associated with non-local source ports, i.e., non-local with respect to the switch core 200. On the other hand, the TCAM stores TTI data associated with global target ports, according to an embodiment. In an embodiment, the TTI classification unit 222 utilizes local source port indicators and/or global target port indicators to perform TCAM lookups. In this embodiment, duplicate TTI data need not be stored in multiple TCAMs of multiple switch cores.

An ingress policy engine 224 is coupled to the TTI classification unit 222. In an embodiment, the ingress policy engine 224 allows Policy Control Lists (PCLs) to be applied to data frames based on criteria such as including Layer 2, Layer 3, and Layer 4 field content in the data frame. In an embodiment, the ingress policy engine 224 is used to implement user applications such as Access Control Lists (ACLs), Quality of Service (QoS), policy-based VLANs, policy-based switching or routing, etc. For example, in an embodiment the ingress policy engine 224 assigns QoS attributes to a data frame, assigns a VLAN to a frame, etc. The policy engine 224 also is used for tracking data flows that ingress via the switch core 200, for example. In an embodiment, the ingress policy engine 224 generally determines whether an ingressing data frame belongs to a particular flow. In an embodiment, the ingress policy engine 224 utilizes the local source port indicator and/or the global target port indicator.

In an embodiment, the policy engine 224 utilizes a TCAM, and the TCAM stores PCL data associated with local source ports of the switch core 200 and does not store PCL data associated with non-local source ports, that is source ports coupled to one of the other switch cores. On the other hand, the TCAM stores PCL data associated with global target ports, according to an embodiment. In an embodiment, the policy engine 224 utilizes local source port indicators and/or global target port indicators to perform TCAM lookups. In this embodiment, duplicate PCL data need not be stored in multiple TCAMs of multiple switch cores.

A bridge engine 226 is coupled to the ingress policy engine 224. The bridge engine 226 includes, or is coupled to, a forwarding database (not seen) for the switch core 200 that includes MAC addresses and global ports corresponding to the MAC addresses. In an embodiment, the forwarding database for the switch core 200 also includes indications of devices (e.g., device numbers) corresponding to the MAC addresses. The bridge engine 226 generally handles the forwarding of packets destined for a segment of a network to which the switch is connected. The bridge engine 226 determines whether a received data frame should be forwarded to a different port and, if so, to which port (e.g., which global target port) the data frame should be forwarded. Determination of whether, and to where a data frame should be forwarded, may be done, for instance, by examining the MAC destination address of the packet and determining a global target port to which the destination address corresponds using the forwarding database. Also, other information may be utilized as well to determine the global target port, such as VLAN information.

In an embodiment, the forwarding database for the switch core 200 includes associations between source MAC addresses and local source port numbers, and between target MAC addresses and global target port numbers. As discussed above, local port numbers are unique within each switch core 104, 150, 200, but are not unique across all switch cores 104, 150, 200 in a switch, such as all the switch cores 104 disposed on IC 100. In an embodiment, the forwarding database for the switch core 200 includes duplicate information as compared to forwarding databases of other switch cores 200 in the IC 100. In this embodiment, forwarding databases of the multiple switch cores 200 are synchronized so that forwarding data changed by one switch core 200 is provided to other switch cores 200. For example, the CPU 120 (FIG. 1) may handle synchronizing forwarding databases of the multiple switch cores 104, 200. For instance, in an embodiment, the switch core 200 notifies the CPU 120 when the bridge engine 226 changes information in the forwarding database, or the CPU 120 detects changes made to the forwarding database, and the CPU 120, in response, makes changes, or causes the other switch cores to make changes, to the other forwarding databases corresponding to the other switch cores on the IC 100.

A router engine 228 is coupled to the bridge engine 226. If a received packet is not destined for a network to which the switch is connected, then routing based on an Internet Protocol (IP) address may be performed. The router engine 228 includes, or is coupled to, a routing information database (not seen) that includes information corresponding to where IP packets should be forwarded. The router engine 228 generally determines to where a received IP packet should be routed. This may be done by examining the IP destination address of the packet and routing information stored in the routing information database. The router engine 228 also maintains the routing information database. In an embodiment, the router engine 228 is compliant with IP version 4 (v4) and IP version 6 (v6). Of course, in other embodiments, the router engine 228 additionally or alternatively may be compliant with one or more other IP versions including previous IP versions and IP versions not yet standardized. Additionally, the router engine 228 may be capable of determining destinations for multicast packets.

An ingress policer engine 230 is coupled to the router engine 228. In an embodiment, the ingress policer engine 230 generally performs operations including rate limiting, makes flow traffic measurements, samples data frames, applies time stamps to data frames or to descriptors, etc.

A multicast replicator 232 is coupled to the ingress policer engine 230. The multicast replicator 232 generally replicates multicast packets, if necessary, for forwarding via multiple ports. In an embodiment, the multicast replicator 232 is compliant with IP v4 and IP v6, for example. Of course, in other embodiments, the multicast replicator additionally or alternatively may be compliant with one or more other IP versions. Additionally, in an embodiment, the multicast replicator 232 supports a multicast extension to the Layer Two Tunneling Protocol (LTTP).

A pre-egress engine 234 is coupled to the multicast replicator 232. The pre-egress engine 234 generally analyzes decisions made by previous units in the ingress pipeline 204 and drops, forwards or duplicates the data frame or descriptor to the egress pipeline 208 and/or the distributor 108 based on the analysis. In an embodiment, the pre-egress engine mirrors and/or traps data frames to the CPU 120, when appropriate, for example for complicated processing that is more suitable to be performed off line than in the ingress pipeline, which typically operates at or near wire speed. In an embodiment, the switch core 200 includes an interface (not seen in FIG. 3) to the CPU 120 via which data frames are forwarded to the CPU 120. In an embodiment, the CPU interface is designated a specific local target port indicator (e.g., the number 63), and thus the pre-egress engine 234 suitably forwards data frames to the CPU 120 via the CPU local port. In another embodiment, the port via which data frames is forwarded to the CPU 120, is designated by a global port indicator.

The pre-egress engine 234 is coupled to the distributor 108. The pre-egress engine 234 is also coupled to the egress pipeline 208 via the distributor 108. In an embodiment, the pre-egress engine 234 is additionally or alternatively directly coupled to the egress pipeline 208, i.e., not via the distributor 108. In such embodiment, the pre-egress engine 234 is configured to send selected data frame descriptors to the egress pipeline 208 directly, i.e., not by way of the distributor 108. The distributor 108 generally forwards data frame descriptors to appropriate switch cores based on the target port indicator. As discussed above, the target port indicator is a global indicator which is unique for port in the switch, and thus the distributor 108 determines one or more appropriate switch cores 104 using the target port indicator.

The egress pipeline 208 is coupled to the distributor 108. In particular, an egress filtering and Layer-2 multicast replication unit 240 is coupled to the distributor 108. In an embodiment, the distributor 108 converts the target port indicator of the data frame from a global port number to a local port number and/or converts the source port indicator of the data frame from a local port number to a global port number. In another embodiment, the egress filtering and Layer-2 multicast replication unit 240 converts the target port indicator of the data frame from a global port number to a local port number and/or converts the source port indicator of the data frame from a local port number to a global port number. Subsequent units of the egress pipeline 208 then utilize the local target port indicator and the global source port indicator for processing the data frame. In an embodiment, each of the switch cores in a switch, for example each switch core 104 on single IC 100, is given a unique switch core indicator, e.g. switch core 00, 01, 10 or 11. A port indicator is deemed a global port indicator after a local port indicator has been combined with the switch core indicator. For example, in one embodiment in which the IC 100 has 48 ports, a port indicator comprises six bits. Four of the six bits (e.g., the least significant four bits) are used to specify a local port. The remaining two bits (e.g., the most significant two bits) are used to specify a switch core. In an embodiment, the port indicator is deemed a global port indicator after the switch core indicator is ORed with the port indicator so that the most significant two bits are set to the switch core indicator. Conversely, a port indicator is deemed a local port indicator when it has not yet been combined with the switch core indicator or when the switch core indicator has been removed from the port indicator. For example, in the embodiment in which the port indicator comprises six bits (the least significant four bits indicating the local port), the port indicator is deemed a local port indicator when the most significant two bits have been set to a predefined value such as 00 (i.e., the most significant two bits are cleared). In these embodiments, a local port indicator can be readily translated to a global port indicator by combining the switch core indicator with the local port indicator, e.g., by ORing. Likewise, a global port indicator can be readily translated to a local port indicator by removing the switch core indicator from the global port indicator, e.g., by masking the two bits corresponding to the switch core indicator or otherwise setting these two bits to a predefined value such as 00. In other embodiments, the switch core indicator can be combined with the local port indicator to create a global port indicator using other suitable logic. In these embodiments, reverse logic is used to remove the switch core indicator from the global port indicator to thereby restore the local port indicator. In other embodiments, the port indicator includes a number of bits other than six, and/or a number of bits other than four is used to specify the local port, and/or a number of bits other than two is used to specify the switch device.

In other embodiments in which the global port indicator comprises a first set of bits that correspond to the local port and a second set of bits that correspond to the switch core indicator, the local port indicator is determined from the global port indicator by merely ignoring the second set of bits that correspond to the switch core indicator, i.e., without setting the second set of bits to a predefined value such as 0.

In an embodiment, the egress filtering and Layer-2 multicast replication unit 240 performs filtering based on the local target port indicator, and also performs filtering based on the global source port indicator. In an embodiment, the egress filtering and Layer-2 multicast replication unit 240 also implements one or more of the following: VLAN egress filtering, spanning tree egress filtering, source port/trunk (utilizing global source port indicator) group egress filtering for multi-target data frames, egress port (utilizing local target port indicator) unregistered multicast and unknown unicast filtering, source identifier (ID) multi-target filtering, etc.

The egress filtering and Layer-2 multicast replication unit 240 also replicates multicast data frames. In a multicast data frame, a multi-target destination is indicated via a multi-target group index, also known as VIDX, in an embodiment. If a data frame is multi-target (i.e. broadcast, multicast, or unknown unicast), the descriptor is replicated for each egress port member of the VIDX group. In an embodiment, the VIDX group data only for local target ports is stored in the memory 170, and VIDX group data for non-local target ports is not stored in the memory 170. Rather, VIDX group data for non-local target ports is stored in one or more memories associated with other switch cores.

Similarly, other tables utilized by the egress filtering and Layer-2 multicast replication unit 240, in an embodiment, provide data only for local target ports, that is target ports that are local to the switch core at which egress processing is being performed. Such tables suitably include one or more of a VLAN table, a spanning tree group (SPG) table, a non trunk members table, a designated port table, etc.

The egress filtering and Layer-2 multicast replication unit 240 forwards unicast traffic to at least one of a plurality of transmit queues. For Layer-2 duplicated data frames, the egress filtering and Layer-2 multicast replication unit 240 replicates the data frame to local ports according to a distribution list. In an embodiment, the egress filtering and Layer-2 multicast replication unit 240 also provides a copy of the data frame to a transmit queue corresponding to a neighbor switch core. In an embodiment, the transmit queue corresponding to the neighbor switch core is designated a specific local target port indicator (e.g., the number 24), and thus the egress filtering and Layer-2 multicast replication unit 240 provides a copy of the data frame to the local target port corresponding to the neighbor switch core. For example, if a first switch core decides to send a data frame to a neighboring second switch core (e.g., because the data frame is a multicast data frame), the first switch core merely sends the data frame to the designated local port (e.g., local port 24). In this embodiment, multicast data frames are forwarded amongst the switch cores, and the transmit queue corresponding to the last transmit queue in the chain terminates the relayed copy to prevent loops. In another embodiment, a transmit queue corresponding to the neighbor switch core is designated a specific global target port indicator.

The egress filtering and Layer-2 multicast replication unit 240 forwards the descriptor, along with a distribution port list, including local port indicators, to a congestion avoidance and resolution unit 242. The congestion avoidance and resolution unit 242 generally performs flow control functions such as generating pause notifications and congestion notifications.

A queue and port shaping/scheduling unit 244 is coupled to the congestion avoidance and resolution unit 242. The queue and port shaping/scheduling unit 244 generally enqueues packet descriptors in a plurality of transmit queues, for example, and performs rate shaping and scheduling functions. Data frames are enqueued according to local target port indicators.

A read DMA unit 246 reads data frames from the memory 170. In an embodiment, the read DMA unit 246 is coupled to and suitably reads data from memories of other switch cores, in which data frames are stored, as well as the memory associated with the switch core 200. For example, the DMA unit 246 is configured to read data frames from memories such as shared memories and/or memories associated with other switch cores and/or memories associated with the switch core 200 at which egress processing is being performed. A header alteration unit 248 is coupled to the DMA unit 246. The header alteration unit 248 generally alters the header of a data frame as needed. For example, a source address, a destination address, etc. may be altered for a next hop, a tunnel header may be prepended if the packet is to be forwarded to a tunnel start interface, etc.

An egress policy engine 250 is coupled to the header alteration unit 248. The egress policy engine 250 generally determines a flow to which an egressing data frame belongs and suitably attaches a flow identifier to the egressing data frame.

An egress policer engine 251 is coupled to the egress policy engine 250. The egress policer engine 251 generally performs rate limiting and makes flow traffic measurements.

A port MAC transmit unit 252 is coupled to the egress policer engine 251. The port MAC transmit unit 252 generally implements media access control functions and forwards packets to appropriate ports 212, i.e., target ports that are associated with the switch core 200. The port MAC transmit unit 252 also may forward or mirror packets to the CPU 120 (FIG. 1).

Figure 4:
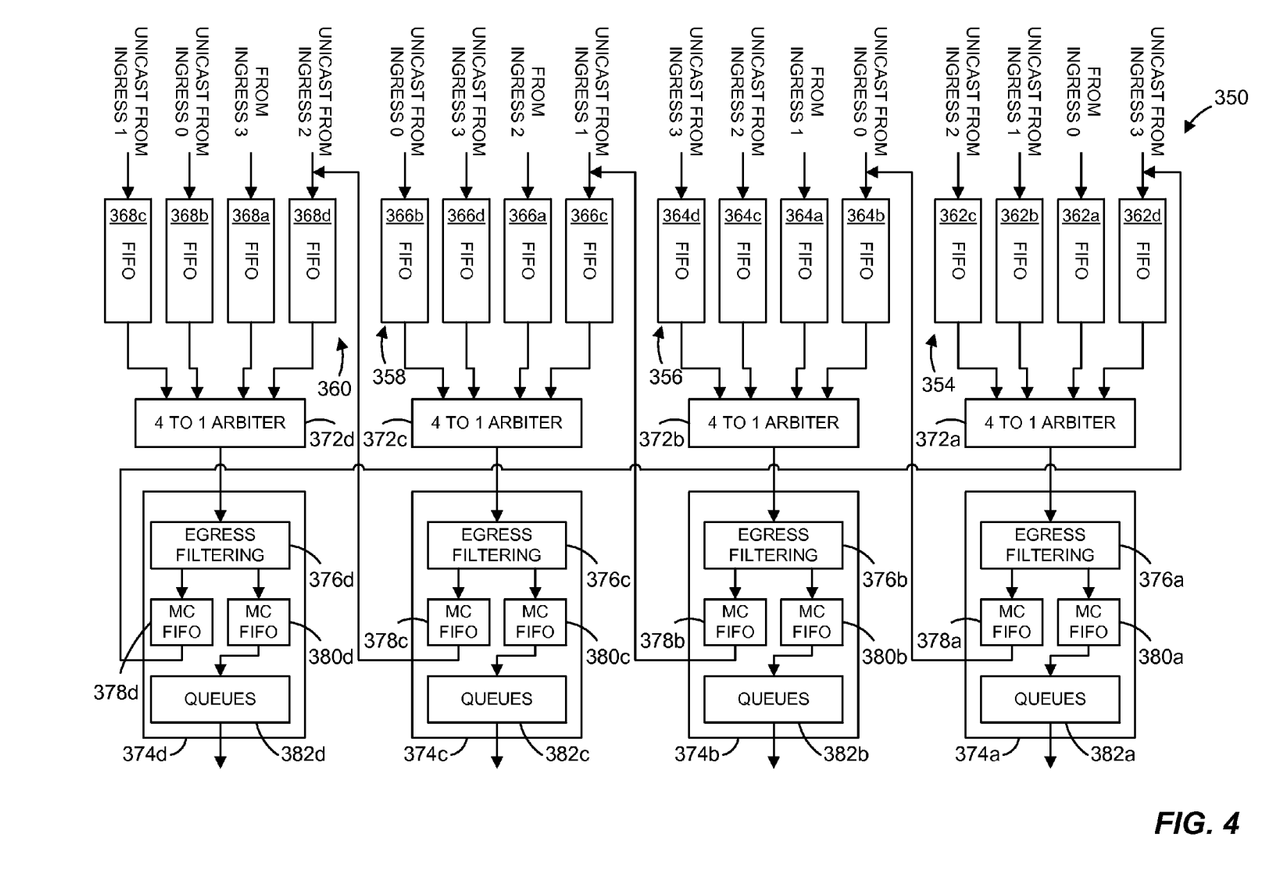
FIG. 4 is a block diagram of an example distributor that is utilized as the distributor of FIG. 1, according to an embodiment.

FIG. 4 is a block diagram of an example distributor 350 that, in an embodiment, is utilized as the distributor 108 of FIG. 1. In other embodiments, a suitable distributor other than the distributor 350 is utilized. The example distributor 350 is for an IC 100 having four switch cores 104. In embodiments with a different number of switch cores, the distributor 350 is suitably modified. FIG. 4 will be described with reference to FIGS. 1, 2 for ease of explanation.

The distributor 350 includes a plurality of first-in-first-out (FIFO) memories arranged into groups 354, 356, 358, 360, each of the groups 354, 356, 358, 360 corresponding to a respective one of the switch cores 104a-104d. For example, the switch cores 104 can be referred to as switch core 0, switch core 1, switch core 2 and switch core 3. Similarly, the ingress processor 186 (FIG. 2) of each switch core can be referred to as ingress 0, ingress 1, ingress 2, or ingress 3, corresponding to switch core 0, switch core 1, switch core 2 and switch core 3, respectively; and the and the egress processor 190 of each switch core can be referred to as or egress 0, egress 1, egress 2, or egress 3, corresponding to switch core 0, switch core 1, switch core 2 and switch core 3, respectively. The FIFO group 354 corresponds to switch core 0. The FIFO group 356 corresponds to switch core 1. The FIFO group 358 corresponds to switch core 2. The FIFO group 360 corresponds to switch core 3.

In the example seen, the FIFO group 354 includes four FIFO memories 362. A FIFO memory 362a receives descriptors from the ingress 0. FIFO memories 362b, 362c, 362d receive descriptors corresponding to unicast data frames from ingress 1, 2, 3, respectively. The FIFO group 356 includes four FIFO memories 364. A FIFO memory 364a receives descriptors from the ingress 1. FIFO memories 364b, 364c, 364d receive descriptors corresponding to unicast data frames from ingress 0, 2, 3, respectively. The FIFO group 358 includes four FIFO memories 366. A FIFO memory 366a receives descriptors from the ingress 2. FIFO memories 366b, 366c, 366d receive descriptors corresponding to unicast data frames from ingress 0, 1, 3, respectively. The FIFO group 360 includes four FIFO memories 368. A FIFO memory 368a receives descriptors from the ingress 3. FIFO memories 368b, 368c, 368d receive descriptors corresponding to unicast data frames from ingress 0, 1, 2, respectively.

The distributor also includes a plurality of arbiters 372. Outputs of the FIFO group 354 are provided to the arbiter 372a, which in turn provides an output to an egress unit 374a (corresponding to egress 0). Outputs of the FIFO group 356 are provided to the arbiter 372b, which in turn provides an output to an egress unit 374b (corresponding to egress 1). Outputs of the FIFO group 358 are provided to the arbiter 372c, which in turn provides an output to an egress unit 374c (corresponding to egress 2). Outputs of the FIFO group 60 are provided to the arbiter 372d, which in turn provides an output to an egress unit 374d (corresponding to egress 3). Each egress unit 374 may be part of an egress processor 190 (FIG. 2), for example.

Each of the egress units 374 includes a respective egress filtering unit 376, a respective pair of FIFO memories 378, 380, and a respective plurality of transmit queues 382. An output of the egress filtering unit 376 is provided to the FIFO memory 380, and an output of the FIFO memory 380 is provided to the plurality of transmit queues 382. Additionally, an output of the egress filtering unit 376 is provided to the FIFO memory 378. An output of the 10 Gbps FIFO memory 378 is provided as input to a FIFO group corresponding to another switch core. For example, an output of the FIFO memory 378a is provided as an input to the FIFO memory 364b. An output of the FIFO memory 378b is provided as an input to the FIFO memory 366c. An output of the FIFO memory 378c is provided as an input to the FIFO memory 368d. An output of the FIFO memory 378d is provided as an input to the FIFO memory 362d. In an embodiment, the distributor 350 is suitable for forwarding multicast data frames amongst the switch cores. For example, a multicast packet is forwarded amongst neighboring switch cores via the MC FIFOs 378. The egress unit 374 corresponding to the last transmit queue in the chain terminates the relayed copy to prevent loops.

Figure 5:
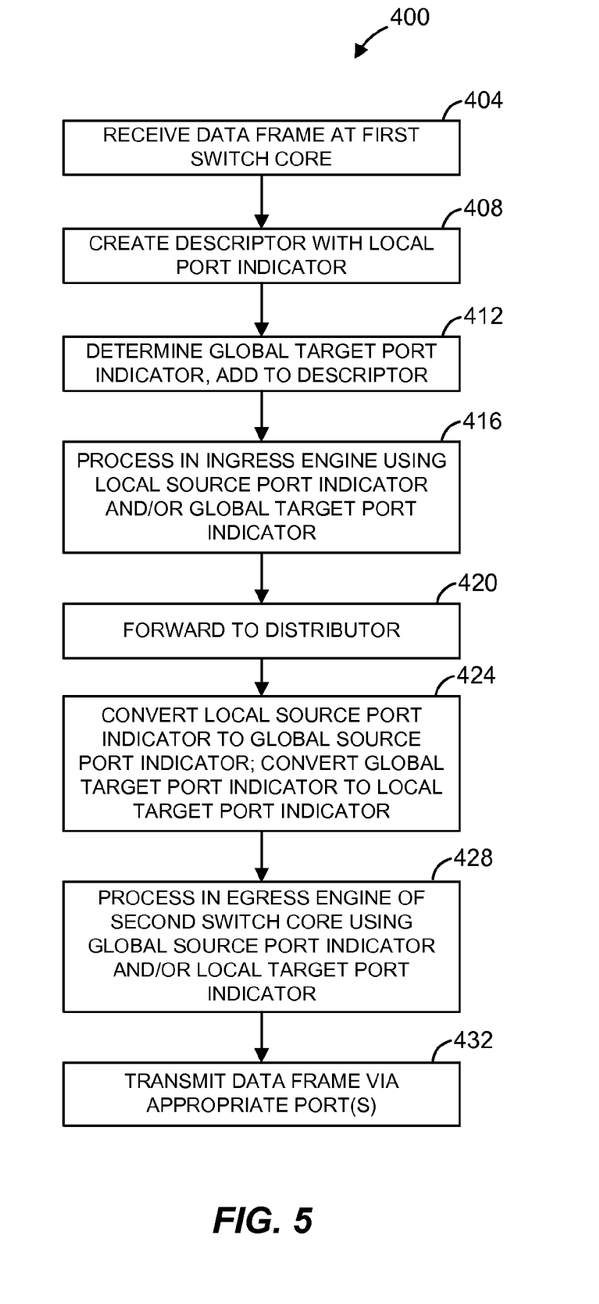
FIG. 5 is a flow diagram of an example method that is implemented by the IC of FIG. 1, the switch core of FIG. 2, and/or the switch core of FIG. 3, according to an embodiment.

FIG. 5 is a flow diagram of an example method 400 that is implemented by the IC 100 of FIG. 1, the switch core 150 of FIG. 2, and the switch core 200 of FIG. 3. The method 400 is suitably implemented, for example, by other suitable systems that utilize multiple switch cores and a distributor to forward data frames and/or descriptors between the switch cores. Additionally, in an embodiment, the IC 100 of FIG. 1, the switch core 150 of FIG. 2, and/or the switch core 200 of FIG. 3 implement other suitable methods as an alternative to implementing the example method 400. For ease of explanation, the method 400 is described with reference to FIGS. 1-3.

At block 404, a data frame is received via a local port of a first switch core, and a descriptor for the data frame is created by the first switch core at block 408. The descriptor includes a local port indicator corresponding to the port of the first switch core at which the data frame was received, i.e., the ingressing port. For example, as discussed above, the write DMA unit 218 of the example switch core 200 creates descriptors for data frames received via local ports corresponding to the switch core 200.

At block 412, a global target port is determined and a global target port indicator is added to the descriptor. For example, as discussed above, the bridge engine 226 of the example switch core 200 determines the global target port indicator for a data frame and adds the global target port indicator to the descriptor.

At block 416, the descriptor is processed in an ingress processor of the switch core and, in particular, the ingress processor utilizes the local source port indicator and/or the global target port indicator to process the descriptor.

At block 420, the descriptor is provided to a distributor that transfers descriptors between the plurality of switch cores. At block 424, the local source port indicator is converted to a global source port indicator, and the global target port indicator is converted to a local target port indicator. The block 424 is suitably implemented in the distributor 108 and/or in the egress processor 190.

In an embodiment, a global port indicator is a number having a width of x-bits, where x is a suitable integer. The z most significant bits, where z is a suitable integer less than x, are an indicator of the switch core. The remaining bits correspond to a local port number. Thus, in this embodiment, a global port number is converted to a local port number by clearing the z most significant bits. Similarly, a local port number is converted to a global port number by setting the z most significant bits to an indicator of the switch core that is coupled to the local port. For example, in an implementation having four switch cores on an IC, and wherein each switch core is to have twelve local ports, a 6-bit number is utilized as the port indicator. In particular, the two most significant bits are utilized to indicate one of the four switch cores. Additionally, the four least significant bits are utilized to indicate the local port number. For a different number of switch cores, a different suitable number of bits is utilized to indicate the switch core. For a different number of local ports, a different suitable number of bits is utilized to indicate the local port.

It is noted, in view of the present disclosure and teachings herein, that there are many other suitable port indicators and techniques for converting between local and global port indicators, and vice versa. For example, the global port number need not comprise a first set of bits indicating the switch core and a second set of bits indicating the local port number.

A translator circuit implements the block 424. Referring to FIGS. 1 and 2, the translator circuit is suitably a component of the distributor 108, the ingress processor 186, and/or the egress processor 190. Referring to FIG. 3, in an embodiment the translator circuit is a component of the egress filtering and L2 multicast replication block 240 or some other block of the egress pipeline 208 and/or the ingress pipeline 204. Additionally, the translator circuit suitably is a separate block in the egress pipeline 208 and/or the ingress pipeline 204.

At block 428, the descriptor is processed in an egress processor of a second switch core and, in particular, the egress processor utilizes the global source port indicator and/or the local target port indicator to process the descriptor. At block 432, the data frame is transmitted via one or more appropriate ports.

In another embodiment, the block 424 is omitted. For example, in an embodiment in which the global port indicator is a number that comprises a first set of bits indicating the switch core and a second set of bits indicating the local port number, the ingress engine and the egress engine ignores the first set of bits to utilize the local port number.

Each of the blocks of FIGS. 1-4, and the method 400 of FIG. 5 may be implemented by hardware. More generally, however, in an embodiment, the blocks of FIGS. 1-4, and the method 400 of FIG. 5 are implemented using hardware, a processor executing firmware instructions, a processor executing software instructions, or any combination thereof. When a block is implemented at least partially using a processor that executes software instructions, the software is stored in any suitable computer readable memory such as on a magnetic disk, an optical disk, or other storage medium, in a RAM or ROM or flash memory of a computer, processor, hard disk drive, optical disk drive, tape drive, etc. Likewise, the software instructions may be delivered to a user or a system via any known or desired delivery method including, for example, on a computer readable disk or other transportable computer storage mechanism or via communication media. When implemented in hardware, the hardware suitably comprise one or more of discrete components, an integrated circuit, an application-specific integrated circuit (ASIC), etc. Referring to FIG. 1, in an embodiment, the system 100 is implemented on a single integrated circuit (IC), and the CPU 120 is implemented on the same IC as the system 100 or on a separate IC that communicates with system 100. In another embodiment, the system 100 is implemented on a plurality of separate ICs. In one embodiment, the system 100 is implemented on a single ASIC, and the CPU 120 is implemented on a separate IC.

Figure 6:
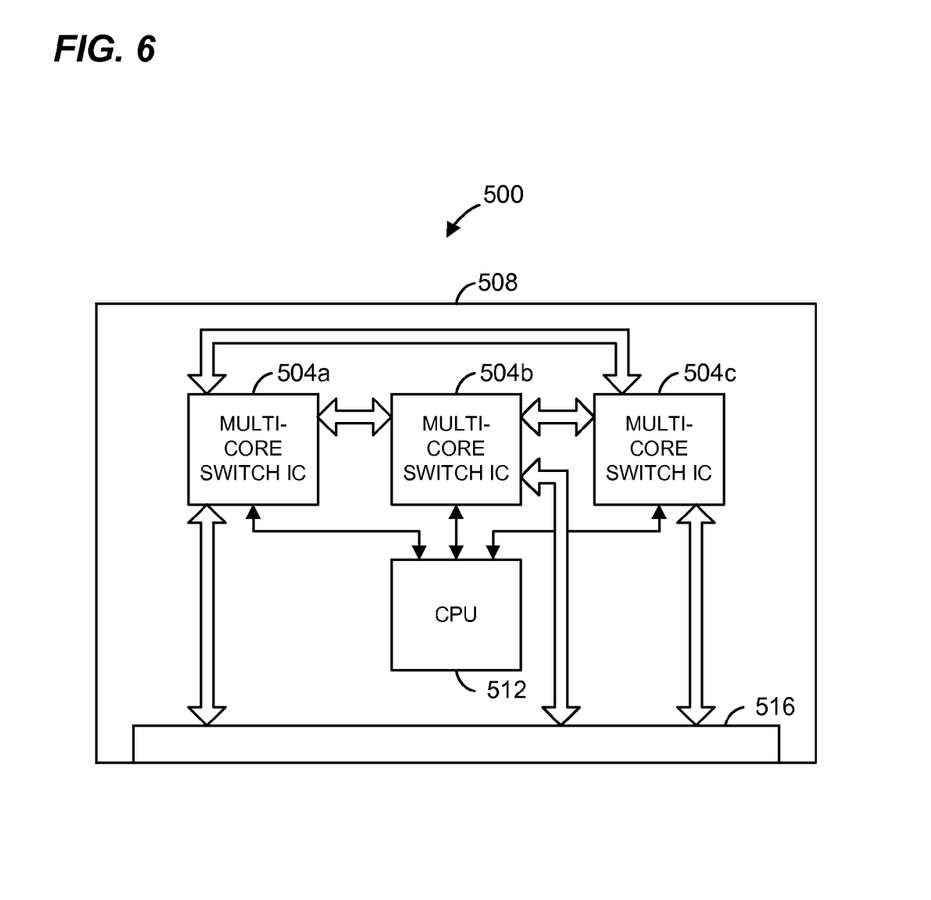
FIG. 6 is a block diagram of an example switch system that utilizes the IC of FIG. 1, according to an embodiment.

FIG. 6 is a block diagram of an example switch device 500. The switch device 500 includes a plurality of switch ICs 504 mounted on a printed circuit board 508. Each of the switch ICs 504 may be the same as or similar to the switch IC 100 of FIG. 1. In an embodiment, each switch IC 504 has ports coupled to ports of one or more of the other switch ICs 504. One or more CPU's 512 are coupled to the switch ICs 504 and are mounted to the printed circuit board 508. The printed circuit board may include one or more connectors 516 for port interconnections with other switches, servers, trunks, etc. One or more of the switch ICs 504 can have ports coupled to the connectors 516. The switch device 500 is capable of supporting a large number of ports.

In another embodiment, each switch IC 504 is disposed on a separate PCB, and each IC 504 shares a common CPU 512. In this embodiment, the CPU 512 is disposed on the same the PCB on which one of the switch ICs 504 is disposed, or on a separate PCB.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A switching device, comprising:
   a plurality of ports; and
   a plurality of switch cores disposed on one or more integrated circuits, the plurality of switch cores including a first switch core corresponding to a subset of ports among the plurality of ports and one or more second switch cores corresponding to ports outside of the subset of ports, wherein the first switch core is configured to:
   perform ingress processing operations on first network data frames received via the subset of ports, wherein the ingress processing operations include determining respective target ports for the first network data frames,
   for first network data frames corresponding to target ports outside of the subset of ports, direct to the one or more second switch cores i) respective header information and ii) respective port identifiers of the determined target ports, so that the one or more second switch cores can i) perform egress processing operations on the first network data frames, and ii) direct the first network data frames to the corresponding target ports using the port identifiers, and
   for network data frames corresponding to target ports within the subset of ports, perform, at the first switch core, egress processing operations on the network data frames, and direct the network data frames to one or more determined target ports in the subset of ports.

2. The switching device of claim 1, further comprising:
   a distributor coupled to the plurality of switch cores, the distributor configured to direct header information and port identifiers of determined target ports among the plurality of switch cores;
   wherein the first switch core is configured to, for first network data frames corresponding to target ports outside of the subset of ports, forward to the distributor i) the respective header information and ii) the respective port identifiers of the determined target ports, so that the distributor can direct to the one or more second switch cores i) the respective header information and ii) the respective port identifiers of the determined target ports.

3. The switching device of claim 2, wherein:
   the first switch core is configured to forward to the distributor i) respective header information and ii) respective port identifiers of the determined target ports regardless of whether the determined target ports are outside of the subset of ports; and
   the distributor is configured to, for target ports within the subset of ports, direct i) the respective header information and ii) the respective port identifiers of the determined target ports back to the first switch core.

4. The switching device of claim 1, wherein switch cores among the plurality of switch cores comprise:
   respective forwarding databases; and
   respective forwarding engines configured to perform an ingress processing operation of determining target ports for network data frames received via respective subsets of ports.

5. The switching device of claim 1, wherein switch cores among the plurality of switch cores are configured to perform an egress processing operation of using port identifiers, including port identifiers determined by other switch cores in the plurality of switch cores, to direct data frames to target ports.

6. The switching device of claim 1, wherein:
   switch cores among the plurality of switch cores comprise respective transmit queues; and
   switch cores among the plurality of switch cores are configured to perform an egress processing operation of enqueuing in respective transmit queues header information corresponding to network data frames that are to be egressed via respective target ports, the enqueued header information including header information received from other switch cores.

7. The switching device of claim 1, wherein switch cores among the plurality of switch cores are configured to perform an egress operation of altering headers of network data frames that are to be egressed via respective target ports.

8. The switching device of claim 1, wherein switch cores among the plurality of switch cores comprise:
respective ingress pipelines configured to perform ingress processing operations on network data frames received via respective subsets of ports corresponding to the switch cores; and
respective egress pipelines configured to perform egress processing operations on network data frames that are to be egressed via the respective subsets of ports corresponding to the switch cores.

9. The switching device of claim 8, wherein the respective egress pipelines are configured to receive i) respective header information and ii) respective port identifiers of target ports corresponding to respective network data frames, including header information and port identifiers provided by other switch cores.

10. The switching device of claim 1, further comprising a shared memory coupled to switch cores among the plurality of switch cores;
wherein switch cores among the plurality of switch cores are configured to:
store in the shared memory network data frames received via the plurality of ports, and
read from the shared memory network data frames that are to be egressed via the plurality of ports.

11. A method, comprising:
receiving, at a first switch core among a plurality of switch cores, first network data frames, the first network data frames having been received via subset of ports corresponding to the first switch core, the subset of ports among a plurality of ports coupled to the plurality of switch cores;
performing, at the first switch core, ingress processing operations on first network data frames received via the subset of ports, wherein the ingress processing operations include determining respective target ports for the first network data frames;
for first network data frames corresponding to target ports outside of the subset of ports, directing to one or more second switch cores i) respective header information and ii) respective port identifiers of the determined target ports, so that the one or more second switch cores can i) perform egress processing operations on the first network data frames, and ii) direct the first network data frames to the corresponding target ports using the port identifiers; and
for network data frames corresponding to target ports within the subset of ports, performing, at the first switch core, egress processing operations on the network data frames, and direct the network data frames to one or more determined target ports in the subset of ports.

12. The method of claim 11, wherein directing to one or more second switch cores comprises:
for first network data frames corresponding to target ports outside of the subset of ports, forwarding, with the first switch core, i) the respective header information and ii) the respective port identifiers of the determined target ports to a distributor; and
directing, with the distributor, i) the respective header information and ii) the respective port identifiers of the determined target ports to the one or more second switch cores.

13. The method of claim 12, further comprising:
forwarding, with the first switch core, i) respective header information and ii) respective port identifiers of the determined target ports regardless of whether the determined target ports are outside of the subset of ports; and
for target ports within the subset of ports, directing i) the respective header information and ii) the respective port identifiers of the determined target ports back to the first switch core.

14. The method of claim 11, wherein performing ingress operations at the first switch core comprises:
using a forwarding database of the switch core to determine the target ports for network data frames received via the subset of ports.

15. The method of claim 11, further comprising performing, at switch cores among the plurality of switch cores, an egress operation of using port identifiers, including port identifiers determined by other switch cores in the plurality of switch cores, to direct data frames to target ports.

16. The method of claim 11, further comprising performing, at switch cores among the plurality of switch cores, an egress operation of enqueuing in respective transmit queues header information corresponding to network data frames that are to be egressed via respective target ports, the enqueued header information including header information received from other switch cores.

17. The method of claim 11, further comprising performing, at switch cores among the plurality of switch cores, an egress operation of altering headers of network data frames that are to be egressed via respective target ports.

18. The method of claim 11, wherein:
performing ingress operations at the first switch core comprises performing ingress operations with an ingress pipeline; and
performing egress processing operations at the first switch core comprises performing egress operations with an egress pipeline.

19. The switching device of claim 18, further comprising:
receiving, at respective one or more egress pipelines of the one or more second switch cores, i) respective header information and ii) respective port identifiers of target ports corresponding to respective network data frames, including header information and port identifiers provided by other switch cores.

20. The method of claim 11, further comprising:
storing, in a shared memory coupled to the plurality of switch cores, network data frames received via the plurality of ports; and
reading, with switch cores among the plurality of switch cores, from the shared memory network data frames that are to be egressed via the plurality of ports.

* * * * *